United States Patent
Maharatna et al.

(10) Patent No.: US 7,606,852 B2
(45) Date of Patent: Oct. 20, 2009

(54) CORDIC UNIT

(75) Inventors: Koushik Maharatna, Bristol (GB); Eckhard Grass, Berlin (DE); Banerjee Swapna, In-Kharagpur (IN); Dhar Anindya Sundar, In-Kharagpur (IN)

(73) Assignee: IHP-GmbH-Innovations for High Performance Microelectronics/Institut fur Innovative Mikroelectronik, Frankfurt (DE)

( * ) Notice: Subject to any disclaimer, the term of this patent is extended or adjusted under 35 U.S.C. 154(b) by 741 days.

(21) Appl. No.: 10/498,707

(22) PCT Filed: Dec. 20, 2002

(86) PCT No.: PCT/EP02/14695

§ 371 (c)(1),
(2), (4) Date: May 19, 2005

(87) PCT Pub. No.: WO03/054689

PCT Pub. Date: Jul. 3, 2003

(65) Prior Publication Data

US 2006/0059215 A1    Mar. 16, 2006

(30) Foreign Application Priority Data

Dec. 20, 2001    (DE) ................................ 101 64 462

(51) Int. Cl.
*G06F 17/16*    (2006.01)
(52) U.S. Cl. ................................... 708/441
(58) Field of Classification Search ................... 708/441
See application file for complete search history.

(56) References Cited

U.S. PATENT DOCUMENTS 5,317,753 A    5/1994    Kuenemund et al.
(Continued)

FOREIGN PATENT DOCUMENTS

DE    4126953 A1    2/1993
(Continued)

OTHER PUBLICATIONS

IEEE Transactions on Circuits and Systems-II: Analog and Digital Signal Processing, vol. 48, No. 6, Jun. 2001, (pp. 548-561), Modified Vector Rotational CORDIC (MVR-CORDIC) Algorithm and Architecture, Cheng-Shing Wu and An-Yeu Wu, Member, IEEE.

(Continued)

*Primary Examiner*—David H Malzahn
(74) *Attorney, Agent, or Firm*—Ware, Fressola, Van Der Sluys & Adolphson LLP

(57) ABSTRACT

A CORDIC unit for the iterative approximation of a vector rotation through a rotary angle θ by a number of elementary rotations through elementary angles $\alpha_i$, including elementary rotation stages for respectively affecting an elementary rotation through an elementary angle $\alpha_i$ as an iteration step in the iterative approximation. After such an elementary rotation there remains a residual angle through which rotation is still to be affected. The elementary rotation stages of the CORDIC unit are adapted for rotation through elementary angles $\alpha_i$ given by powers of two with a negative integral exponent. The CORDIC unit can also include a triggering device for triggering the elementary rotations, a triggering device which is adapted prior to each iteration step to compare the residual angle to at least one of the elementary angles and to omit those elementary rotation stages whose elementary angles are greater than the residual angle.

9 Claims, 8 Drawing Sheets

U.S. PATENT DOCUMENTS

| | | | |
|---|---|---|---|
| 6,349,317 B1 * | 2/2002 | Kantabutra | 708/441 |
| 6,656,852 B2 | 12/2003 | Rotondaro et al. | |
| 2003/0097388 A1 * | 5/2003 | Wu et al. | 708/441 |
| 2003/0119291 A1 | 6/2003 | Ahn et al. | |
| 2003/0228747 A1 | 12/2003 | Ahn et al. | |
| 2004/0057503 A1 * | 3/2004 | Kelley | 375/148 |

FOREIGN PATENT DOCUMENTS

| | | |
|---|---|---|
| DE | 4335925 A1 | 4/1995 |
| EP | 0 297 588 A2 | 1/1989 |
| EP | 0297588 A2 | 1/1989 |

OTHER PUBLICATIONS

IEEE Transactions on Computers, vol. 43, No. 11, Nov. 1994, (pp. 1339-1344), A Unified and Division-Free CORDIC Argument Reduction Method with Unlimited Convergence Domain Including Inverse Hyperbolic Functions, Helmut Hahn, et al.

XP-001022227, A Unified Algorithm for Elementary Functions by J.S. Walter, Hewlett Packard Company, Palo Alto, CA, (pp. 379-385), 1971.

IEEE Signal Processing Magazine, Jul. 1992, (pp. 16-35), CORDIC-Based VLSI Architectures for Digital Signal Processing, Yu Hen Hu.

English translation of Abstract for DE 4126953 A1.

English translation of Abstract for DE 4335925 A1.

Acoustics, Speech, and Signal Processing, IEEE International Conference on ICASSP 1983; J. Delosme; "VLSI Implementation of Rotations in Pseudo-Euclidean Spaces"; 1983; pp. 927-930.

* cited by examiner

CORDIC UNIT

CROSS REFERENCE TO RELATED APPLICATIONS

This application is for entry into the U.S. national phase under §371 for International Application No. PCT/EP02/14695 having an international filing date of Dec. 20, 2002, and from which priority is claimed under all applicable sections of Title 35 of the United States Code including, but not limited to, Sections 120, 363 and 365(c), and which in turn claims priority under 35 USC §119 to German Patent Application No. 101 64 462.0 filed on Dec. 20, 2001.

TECHNICAL FIELD

The invention concerns a unit for executing a co-ordinate rotation digital computer algorithm, referred to for brevity as a CORDIC unit, a pre-processor for a CORDIC unit and a CORDIC apparatus which includes a CORDIC unit according to the invention and a pre-processing unit according to the invention.

BACKGROUND ART

CORDIC units are employed for example in synchronizing devices of modems for the standards IEEE 802.11(a) and Hyperlan/2. In such synchronizing devices on-line calculations of the arc tan function and complex multiplications of data, using the sine and the cosine function are necessary.

The mode of operation of CORDIC units is based on the CORDIC algorithm. The CORDIC algorithm is an algorithm for efficiently computing various transcendental and geometrical functions. Examples of such functions which can be computed directly by means of the CORDIC algorithm are geometrical and arithmetic multiplication, division operations, the sine and cosine function, the root function, the inverse tangent, the inverse hyperbolic tangent, the hyperbolic sine and the hyperbolic cosine. Those basic functions can be used for computing further functions, for example logarithms. An essential feature of the conventional CORDIC algorithm is that it can be implemented as a recursive method in which rotation is approximated by a series of forward and reverse rotations through fixedly predetermined elementary angles. Those forward and reverse rotations, referred to hereinafter for brevity as elementary rotations, can be embodied by adding, subtracting, shift and table operations. Thus the CORDIC algorithm can be embodied in the form of a CORDIC unit, for example a digital CORDIC processor, which only needs to include adders/subtractors, shifters and reference tables, but for example no real digital multiplier.

CORDIC units compute from three input values x0, y0 and z0 three output values x1, y1 and z1, wherein x0 and y0 are the co-ordinates of the vector to be rotated and z0 is the rotational angle through which the rotation occurs, which is to be approximated by the CORDIC algorithm. The CORDIC algorithm can either be effected in such a way that y1 tends towards zero (vectoring mode) or that z1 tends towards zero (rotation mode). Each of those two modes can be used in polar co-ordinates, hyperbolic co-ordinates or linear co-ordinates.

In the conventional CORDIC algorithm the angular range of the rotary angles which can be approximated is limited to a given range, the convergence range. That convergence range is given in the conventional CORDIC algorithm by the angular interval [−99.9°, 99.9°]. So that y1 or z1 can tend towards zero $|\tan^{-1}(y0/x0)|$ or $|z0|$ must be in the convergence range, that is to say less than or equal to 99.9°.

In addition upon a rotation through an elementary angle in the conventional CORDIC algorithm the length of the rotated vector is not constant. Thus, for each elementary rotation there is a factor by which the length of the vector changes. Those changes in length must be taken into consideration by a scaling factor in the output values x1 and y1. The scaling factor is a constant if the CORDIC process is always carried out using all implemented elementary rotations.

Furthermore the CORDIC algorithm is slow to execute by virtue of its iterative nature.

In order to enlarge the limited convergence range of the CORDIC algorithm, J. S. Walther, "A Unified Algorithm for Elementary Functions", Proc. Joint Spring Comput. Conf., vol 36, pages 379-385, July 1971, proposed using mathematical identities to subject the input values x0, y0 and z0 to a pre-processing operation. That procedure is known as the "argument reduction process". Admittedly such mathematical identities actually help when overcoming the limited convergence range but they are unwieldy for hardware uses by virtue of the necessary processing time and expenditure.

A further approach for overcoming the limited convergence range is described for example in J. M. Delosme, "VLSI Implementation of Rotations in Pseudo-Euclidean Spaces", Proc. ICASSP, vol 2, pages 927-930. That approach requires the repetition of given iteration steps. In dependence on how the iteration steps to be repeated are determined, many such iteration steps to be repeated may be necessary in order to achieve a result with the desired level of accuracy. However, with the number of iteration steps to be repeated, the processing time required for that purpose also increases. In addition, in that approach the scaling factor is not a constant as the number of iteration steps and thus the number of elementary rotations to be effected is not constant.

Therefore the object of the present invention is to provide a CORDIC unit which is improved over conventional CORDIC units.

A further object of the invention is to provide a pre-processing unit for a CORDIC unit, with which the angular range for the rotary angle to be actually calculated by the CORDIC unit can be reduced.

DISCLOSURE OF THE INVENTION

The CORDIC unit according to the invention for the iterative approximation of a vector rotation through a rotary angle θ by a number of elementary rotations through elementary angles $\alpha_i$ includes elementary rotation stages for respectively effecting an elementary rotation through an elementary angle $\alpha_i$ as an iteration step of the iterative approximation procedure. After such an elementary rotation there remains a residual angle through which rotation is still to be implemented. The elementary rotation stages of the CORDIC unit according to the invention are designed for rotation through elementary angles $\alpha_i$ which are given by powers of two with a negative integral exponent. In addition the CORDIC unit according to the invention includes a triggering unit for triggering the elementary rotations, which is adapted prior to each iteration step to compare the residual angle to at least one of the elementary angles and to leave out such elementary rotation stages whose elementary angles are greater than the residual angle.

Instead of a number of elementary rotation stages it is also possible to have a single programmable elementary rotation stage. Programmable means in this respect that the elementary rotation stage can input an elementary rotary angle through which it performs the elementary rotation.

The configuration of the CORDIC unit according to the invention provides that processor steps can be omitted in comparison with conventional CORDIC units. That reduces the activity of the overall circuit and thus the power consumption thereof.

In a further configuration the triggering device of the CORDIC unit according to the invention includes at least a first comparator, a second computing unit for computing the elementary angles and a second computing unit for computing the residual angle through which rotation is still to be effected after an elementary rotation through a current elementary angle has been effected. The first comparator is adapted either after an elementary rotation to receive the residual angle through which rotation is still to be effected and to check whether the residual angle is greater than or equal to the current elementary angle and, if that is the case, to output a computing signal to the elementary rotation stage corresponding to the current elementary angle for renewed execution of an elementary rotation through the current elementary angle or, after the computation of a new elementary angle, to receive the new elementary angle and to check whether the residual angle is greater than or equal to the new elementary angle and, if that is the case, to output a computation signal to the elementary rotation stage corresponding to the new elementary angle for the execution of an elementary rotation through the new elementary angle and otherwise to emit a computation signal to the first computing unit which triggers the computation of a new elementary angle with a new exponent which is reduced by one, that is to say a new exponent which is increased in amount by one.

The computing unit for computing the residual angle is advantageously integrated into the elementary rotation stages.

With this configuration of the CORDIC unit, it is possible in dependence on the rotary angle to determine which iteration steps are to be omitted. Direct comparison of the remaining rotary angle and a current elementary angle for the decision as to whether a given iteration step is or is not to be executed permits substantially faster processing, in comparison with known algorithms such as the Greedy algorithm, and in addition permits simpler hardware implementation. A Greedy algorithm is more expensive as it first determines an error function and then iteratively minimizes it. The comparison which is carried out in the present process in contrast can already be performed with a single-bit comparison. If for example the current elementary angle is $2^{-5}$, it is only necessary to check whether a "1" is to be found at the bit position 5 of the remaining or residual angle. If that is the case the vector is rotated. If that is not the case the vector is not rotated. As there is also only one rotation direction, the single-bit comparison affords a unique result.

Advantageously the CORDIC unit can include a second comparator which is adapted after each elementary rotation to check whether the residual angle remaining after the elementary rotation is less than a predetermined reference value and to terminate the iterative approximation if that is the case. The reference value represents for example the maximum deviation of the residual angle from zero, which is to be admissible at the end of the approximation procedure. It can depend for example on the necessary degree of accuracy which further uses make on the approximation. Terminating the iterative approximation procedure as soon as the reference value is reached or the value falls below the reference value makes it possible to avoid further unnecessary elementary rotations.

In an alternative configuration of the CORDIC unit according to the invention for the iterative approximation of a vector rotation through a rotary angle θ by a number of elementary rotations through elementary angles $\alpha_i$ the CORDIC unit has a word length of b bits. In addition it includes elementary rotation stages which are adapted for rotation through elementary angles which are given by powers of two with a negative integral exponent −i. The elementary angles can then be represented by the values $\alpha_i = 2^{-i}$. The exponent i which is minimum in terms of amount and thus the maximum elementary angle is given by a number p which is the smallest whole number which with a word length of b bits for i can be introduced into the sum:

$$\sum_{n=1}^{\infty} -1^n \frac{2^{-(2n+1)i}}{(2n+1)!}$$

so that the value of the sum gives the machine zeros. The machine zeros are all those binary numbers whose first b bits contain only zeros. With a word length of b bits such binary numbers cannot be distinguished from the zero. The exponent which is maximum in terms of amount and thus the minimum elementary angle is given by b−1.

Such a choice of the elementary angles provides that no scaling factor is necessary for the CORDIC unit. The alternative configuration of the CORDIC unit can also be combined with the above-described configuration.

In a further configuration of the invention, there is at least one elementary rotation stage for each exponent which in terms of amount is greater than or equal to p and smaller than or equal to b−1. In particular the CORDIC unit may include more than one elementary rotation stage which is adapted for rotation through the maximum elementary angle. The angular range which can be achieved with the CORDIC unit can be increased by the repeated rotation through the maximum rotary angle.

In still a further configuration of the CORDIC unit according to the invention all elementary rotation stages which are adapted for rotation through elementary angles and whose exponent in terms of amount is smaller than (b−1)/2 include four shifters, two subtractors and two adders/subtractors and all other elementary rotation stages include two shifters and two adders/subtractors.

In addition the invention provides a pre-processing unit which includes a pre-processing circuit which is adapted to transfer rotary angles between π/8 and 2π degrees into the range between 0 and π/8. With such a pre-processing circuit it is possible to use the CORDIC unit for the approximation of rotary angles in the entire angular range of 360°.

In particular the pre-processing circuit can be adapted to transfer rotary angles in the first quadrant of a co-ordinate system into the interval between 0 and π/8 by the rotary angle being subtracted from π/4 when it is in the interval between π/8 and π/4, by being added to the rotary angle π/4 when it is in the interval between π/4 and 3π/8, or by the rotary angle being subtracted from π/2 when it is in the interval between π/4 and 3π/8, and transfer rotary angles which are in the second through fourth quadrant of the co-ordinate system into the first quadrant beforehand utilizing the symmetry of the co-ordinate axes.

The pre-processing unit according to the invention can be used in particular in a CORDIC unit as a pre-processing unit for a CORDIC unit according to the invention.

The CORDIC unit according to the invention can be used in various modes, in particular in the "rotation mode" and in the "vectoring mode".

The rotation mode is used to rotate a vector represented in a co-ordinate system by the components x0 and y0 through an angle z0, that is to say to compute the components x, y of the rotated vector. In the vectoring mode in contrast the amount $\sqrt{x0^2+y0^2}$ of the vector and the angle which the vector includes with x-axis of the co-ordinate system are computed. In the rotation mode the iteration procedure is continued until z assumes a value which is sufficiently close to zero to satisfy the requirements in respect of accuracy when computing the co-ordinates of the rotated vector. In the vectoring mode in contrast the iteration procedure is continued until y assumes a value which is sufficiently close to zero to satisfy the requirement in respect of accuracy of the result for amount and angle.

BRIEF DESCRIPTION OF THE DRAWINGS

Further features and advantages of the invention will be apparent from the detailed description hereinafter of an embodiment by way of example with reference to the accompanying drawings.

DETAILED DESCRIPTION OF THE INVENTION

Figure 1:
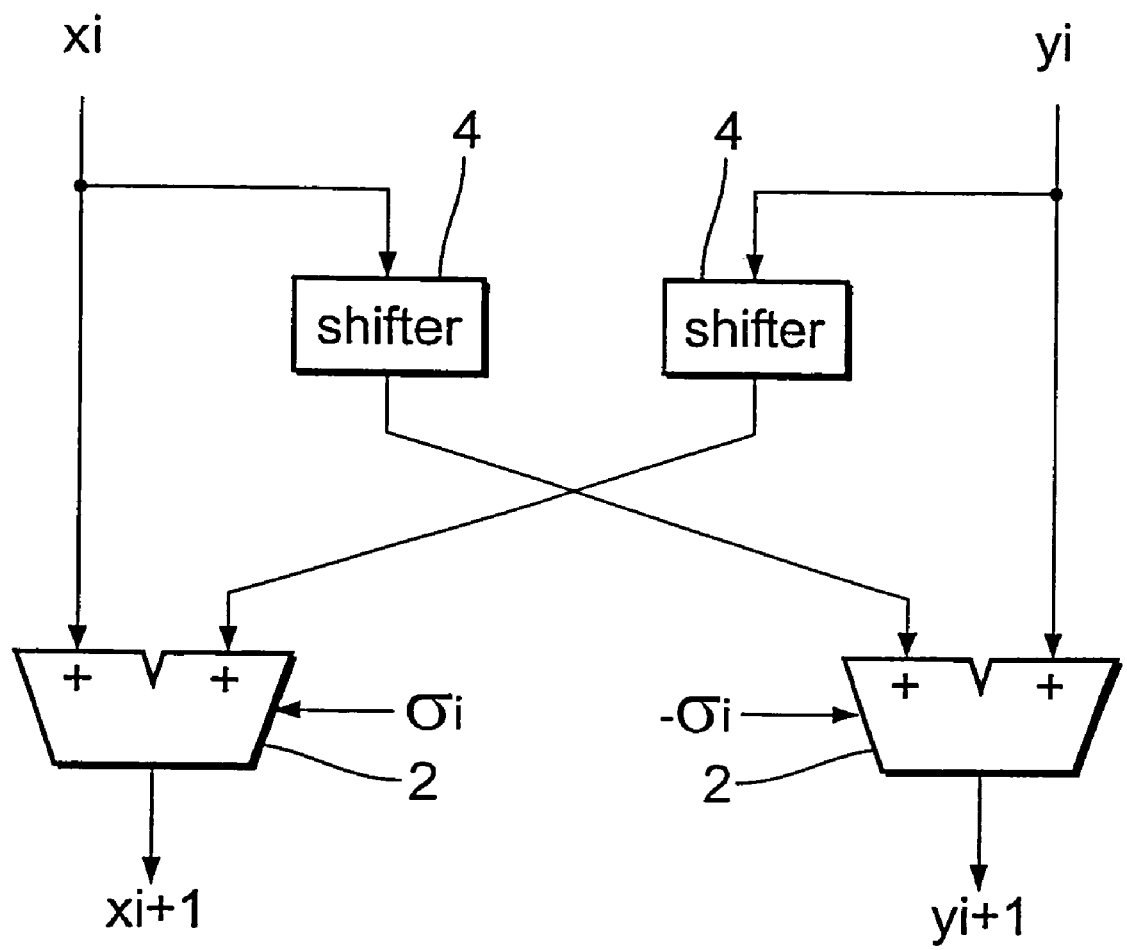
FIG. 1 shows an elementary rotation stage as is used in a conventional CORDIC unit.

There now follows firstly a description of the conventional CORDIC algorithm, to make it easier to understand the invention. Rotation of a vector with the co-ordinates x0 and y0 can be described in a Cartesian co-ordinate system as:

$$\begin{bmatrix} x1 \\ y1 \end{bmatrix} = \begin{bmatrix} \cos\theta & \sin\theta \\ -\sin\theta & \cos\theta \end{bmatrix} \begin{bmatrix} x0 \\ y0 \end{bmatrix} \quad (1)$$

wherein x1 and y1 are the co-ordinates of the rotated vector and θ is the rotary angle. It has been assumed in the foregoing equation that the rotation takes place in the clockwise direction. The CORDIC algorithm is based on the fact that the rotation through the rotary angle θ can be represented by a series of elementary rotations through elementary angles $\alpha_i$. If the CORDIC algorithm is embodied in the form of a CORDIC unit with the word length b the rotary angle θ is given by the following formula:

$$\theta = \sum_{i=0}^{b-1} \sigma_i \alpha_i \quad (2)$$

The factor $\sigma_i$ can either assume the value 1 or −1, in dependence on the direction of the elementary rotation. In the conventional CORDIC algorithm $\alpha_i$ is given by the formula:

$$\alpha_i = \tan^{-1}(2^{-i}) \quad (3)$$

If now in equation 1 for the rotary angle θ the sum in accordance with equation 2 is used with the elementary rotary angles in accordance with equation 3 then the rotation through the angle θ can be represented by the following iterative equations:

$$\begin{bmatrix} x_{i+1} \\ y_{i+1} \end{bmatrix} = \cos(2^{-i}) \begin{bmatrix} 1 & \sigma_i 2^{-i} \\ -\sigma_i 2^{-i} & 1 \end{bmatrix} \begin{bmatrix} x_i \\ y_i \end{bmatrix} \quad (4)$$

$$z_{i+1} = z_i + \sigma_i 2^{-i} \quad (5)$$

Therein z0 stands for the rotary angle θ by which the vector with the components x0 and y0 is to be rotated. The value of the factor $\sigma_i$ is obtained from the value of $z_i$, the residual angle through which rotation still has to be effected. If $z_i$ is greater than or equal to 0, then $\sigma_i$ assumes the value −1, while if $z_i$ is less than 0, it assumes the value +1.

The equations 4 and 5 are the basic equations of the CORDIC algorithm. The physical significance of those equation is that the rotary angle specified as $z_0$ is approximated to 0 by forward and back rotation of the vector through elementary angles $\alpha_i$. It is to be noted that the iteration equations 4 and 5 only require additions, subtractions and multiplications with factors $2^{-i}$. From the point of view of hardware implementation therefore only adders/subtractors and shifters are necessary for implementation of the iteration equations. In that case the shifters effect multiplication by the factors $2^{-i}$ as multiplication by a factor $2^{-i}$ in the binary system is no different from a shift of the binary number towards the right by i places. In the conventional implementation of the CORDIC algorithm therefore each rotation through the elementary angle $\alpha_i$, as shown in FIG. 1, is effected by two adders/subtractors 2 and two shifters 4.

A disadvantage of the conventional CORDIC algorithm however is that the rotated vector with the components x1 and y1 which represents the result of iteration determined with the iteration equations 4 and 5 has to be scaled with a factor $\Pi_{i=0}^{b-1} \cos(2^{-i})$. That can be understood in geometrical terms such that the vector rotated through the elementary angle $2^{-i}$ with the components $x_{i+1}$ and $y_{i+1}$ is longer by a factor $\cos(2^{-i})$ than the vector with the components $x_i$ and $y_i$ prior to the elementary rotation. If all elementary rotations of i=0 to i=b−1 are effected that factor is only a constant which can be determined beforehand and stored. If however some of the elementary rotations are left out then the scaling factor is no longer a constant. Rather, it depends on which elementary rotations are left out and which are not. In order to take account of such a non-constant scaling factor, a complicated hardware structure is necessary or suitable post-processing cycles are required, which increase the processing cost.

Now a first embodiment of the implementation according to the invention of the CORDIC algorithm is described hereinafter. As has been described above, in the conventional CORDIC algorithm the rotary angle is approximated by elementary rotations both in the clockwise direction and also in the counter-clockwise direction. In contrast thereto, in accordance with the invention, the rotary angle is approximated exclusively by elementary rotations in a single direction. This means that all elementary rotations are executed either in the clockwise direction or in the counter-clockwise direction. In order to permit that, it is ensured that no rotation is effected, which would have to be followed by a rotation in the opposite direction. In other words, after each elementary rotation, the procedure involves determining the residual angle by which rotation is still to be rotated and then that residual angle is compared to the elementary angles. Elementary rotations, the elementary angle of which is greater than the remaining residual angle, are not effected.

The elementary angles in the implementation according to the invention of the CORDIC algorithm are given by the formula:

$$\sin \alpha_i \approx \alpha_i = 2^{-i} \quad (6)$$

The concept on which the invention is based is as follows:
The infinite sum:

$$1 + \frac{1}{2} + \frac{1}{4} + \frac{1}{8} + \cdots + \frac{1}{2^n} + \cdots \quad (7)$$

converges and is of the value 2. If a specific value $1/2^n$ is selected from that infinite sum and all terms of the sum up to and including $1/2^n$ are omitted, the remainder of the sum converges towards $1/2^n$.

By the selection $\alpha_i = 2^{-i}$ the sequence from equation 2 becomes:

$$\theta = \sum_{i=0}^{b-1} \sigma_i 2^{-i} \quad (8)$$

Therein b is the word length used in implementation of the CORDIC algorithm. The terms of the sum with i greater than b−1 correspond to the machine zero with the word length of b.

If now a residual angle $z_i$ which is to be approximated in the coming iteration steps is in the range between two elementary angles with successive exponents, that is to say between $2^{-k}$ and $2^{-(k+1)}$, then the elementary rotations through the elementary angles up to $2^{-k}$, that is to say the elementary angles which are greater than the residual angle, can be left out in the approximation procedure. The residual angle however can still always be sufficiently accurately approximated by the elementary angles $2^{-i}$ with i>k as an approximation of angles up to $2^{-k}$ is possible. By omitting elementary rotations with elementary angles which are greater than the residual angle it is possible to approximate the angle 0 which is to be approximated, only ever by elementary rotations in a single direction as reverse rotations are not necessary.

Omitting elementary rotations makes it possible to reduce the number of iteration steps to be executed and thus the overall activity of the circuit which embodies the CORDIC algorithm and therewith for example its energy consumption and/or the computing time. That advantage is afforded in any kind of implementation of the method described in the specific embodiment.

As discussed in the opening part of this specification the omission of iteration steps generally involves a non-constant scaling factor. By virtue of the clever choice of the elementary angles $\alpha_i$ however it is possible to obtain a constant scaling factor, in spite of omitting iteration steps. The scaling factor is constant in the following second embodiment for the implementation according to the invention of the CORDIC algorithm.

In order to obtain a constant scaling factor the elementary angles $\alpha_i$ must be so small that the relationship $\sin \alpha_i \approx \alpha_i$ is sufficiently precisely satisfied. Sufficiently precisely means here that $\alpha_i$ must be sufficiently small so that the errors which occur by virtue of the fact that $\sin \alpha_i$ is approached by $\alpha_i$ are less than the smallest number which can be represented as a binary number with a given word length b in respect of the selected implementation of the CORDIC algorithm. With a word length of 16 bits for example a shift of each binary number by 16 places towards the right leads to a binary number whose first 16 places still only contain zeros, that is to say, the machine zero. On the basis of the condition that the errors which result from the fact that $\sin \alpha_i$ is approached by $\alpha_i$ are so small that they give the machine zero, it is possible to determine the greatest elementary angle $\alpha_i$ for which the approximation has no effects in an implementation with a word length of b bits.

The sine function and the cosine function can be represented as infinite sums. Those sums are given by the formulae:

$$\sin \alpha_i = \alpha_i - \frac{\alpha_i^3}{3!} + \frac{\alpha_i^5}{5!} - \cdots \quad (9)$$

$$\cos \alpha_i = 1 - \frac{\alpha_i^2}{2!} + \frac{\alpha_i^4}{4!} - \cdots \quad (10)$$

If $\alpha_i = 2^{-i}$ is introduced into those formulae, that gives:

$$\sin \alpha_i = 2^{-i} - \frac{2^{-3i}}{6} + \frac{2^{-5i}}{120} - \cdots \quad (11)$$

$$\cos \alpha_i = 1 - \frac{2^{-2i}}{2} + \frac{2^{-4i}}{24} - \cdots \quad (12)$$

It will be seen that in that series development the largest term which is omitted by the approximation $\sin \alpha_i \approx \alpha_i = 2^{-i}$ is the second term in the series development of the sin. That term can also be represented as:

$$\frac{2^{-3i}}{6} = 2^{-(3i + \log_2 6)} = 2^{-(3i + 2.585)} \quad (13)$$

The condition that the error upon approximating $\sin \alpha_i$ by $\alpha_i$ is so small that it only gives the machine zero is now that, as the exponent i, only those values are used for which the sum $$\sum_{n=1}^{\infty} -1^n \frac{2^{-(2n+1)i}}{(2n+1)!} \quad (14)$$

becomes the machine zero. That is the case upon implementation of the embodiment according to the invention of the CORDIC algorithm with a word length of 16 bits in the case of all i greater than or equal to 4.

In particular the condition is satisfied if i is greater than or equal to $[(b-2.585)/3]=p$. In that respect p denotes the smallest whole number which is greater than or equal to the bracketed expression. If the CORDIC algorithm is implemented by means of a processor which has a word length of b bits, the term $2^{-(3i+2.585)}$ disappears in the binary representation if $[(b-2.585)/3]$ is greater than or equal to the word length b of the processor as multiplication by $2^{-b}$ always signifies a shift towards the right by b places and thus always leads to the machine zero. So that the second term in the series development of the sin disappears therefore $3i+2.585$ must be greater than or equal to b. At any rate all further terms are then the machine zero as they are smaller than $2^{-(3i+2.585)}$. That at any event determines a minimum exponent for the elementary angles $\alpha_i=2^{-i}$, which may be used without an error occurring with a word length of b bits by virtue of approximation of sin $\alpha_i$ by $\alpha_i$. The greatest exponent with a word length of b bits is always given by b−1 as an elementary angle $2^{-b}$ again leads to the machine zero. With a word length b of 16 bits, that gives the value 4.472 for $[(b-2.585)/3]$ and thus p=5. In actual fact, as already noted above, upon implementation of the embodiment according to the invention of the CORDIC algorithm, with a word length of 16 bits, as the greatest exponent, it is possible to use the value i=4 instead of the value i=5. Admittedly the term $2^{-(3i+2.585)}$ then does not become the machine zero, but the higher terms in equation 14 afford a contribution to the overall sum of equation 14 which causes the overall sum to become the machine zero.

On the condition that the error becomes the machine zero when using $2^{-i}$ instead of sin $2^{-i}$, sin $2^{-i}$ and cos $2^{-i}$ can now be approximated by $2^{-i}$ and $1-2^{-i}$ respectively. If those representations are used for sin $\alpha_i$ and cos $\alpha_i$ in equation 1, it is possible to derive the following iteration equations:

$$\begin{bmatrix} x_{i+1} \\ y_{i+1} \end{bmatrix} = \begin{bmatrix} 1-2^{-(2i+1)} & 2^{-i} \\ -2^{-i} & 1-2^{-(2i+1)} \end{bmatrix} \begin{bmatrix} x_i \\ y_i \end{bmatrix} \quad (15)$$

$$z_{i+1} = z_i - 2^{-i} \text{ or } z_{i+1} = z_i + 2^{-i} \quad (16)$$

The sign in front of the term 231 i in equation 16 depends in this case on whether the angle z0 through which rotation is to be effected is positive or negative. The value $\sqrt{1+2^{-(4i+2)}}$ is obtained as the scaling factor. With a word length of more than 4 bits, for all elementary angles which are used for approximating the rotary angle, the summand $2^{-(4i+2)}$ affords the machine zero. The elimination of the scaling term is an important step as it not only makes a specific post-processing circuit redundant but also saves on processing time.

Figure 2:
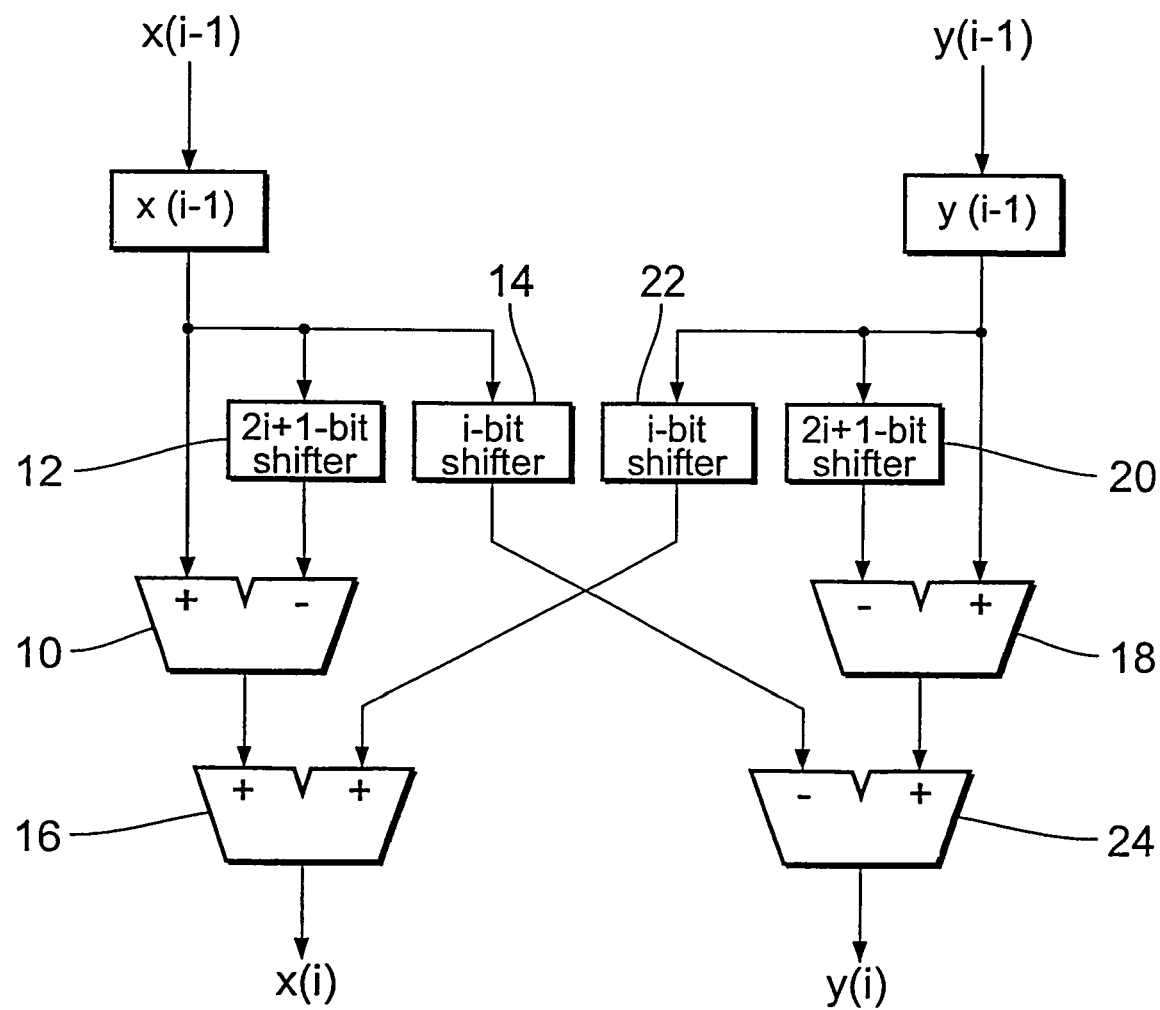
FIG. 2 shows the structure of an elementary rotation stage in the CORDIC unit according to the invention.

In regard to the circuitry the foregoing equation can be embodied by four shifters, two subtractors and two adders/subtractors. A corresponding elementary rotation stage is shown in FIG. 2. The value $x_{i-1}$ is passed to a first subtractor 10, a first (2i+1)-bit shifter 12 and a first i-bit shifter 14. Besides the value $x_{i-1}$ the value of $x_{i-1}$ shifted by the first (2i+1)-bit shifter 12 by (2i+1) bits is also passed to the first subtractor 10.

The value $y_{i-1}$ is passed to a second subtractor 18, a second (2i+1)-bit shifter 20 and a second i-bit shifter 22. Besides the value $y_{i-1}$ the value of $y_{i-1}$ shifted by the second (2i+1)-bit shifter 20 by (2i+1) bits is also fed to the second subtractor 18.

The first subtractor 10 subtracts from $x_{i-1}$ the value of $x_{i-1}$ shifted by (2i+1) bits and transmits the result to a first adder/subtractor 16. In addition the first adder/subtractor 16 receives from the second i-bit shifter 22 a value of $y_{i-1}$ shifted by i-bits and, with a rotation in the clockwise direction, adds same to $x_{i-1}$. The result of that addition is outputted as the value $x_i$. In the case of a rotation in the counter-clockwise direction, subtraction is effected instead of the addition.

The second subtractor 18 subtracts from $y_{i-1}$ the value of $y_{i-1}$ shifted by (2i+1) bits and transmits the result to a second adder/subtractor 24. In addition the second adder/subtractor receives from the first i-bit shifter 14 a value of $x_{i-1}$ shifted by i-bits, and subtracts it from $y_{i-1}$. The result of that subtraction is outputted as the value $y_i$. In the case of a rotation in the counter-clockwise direction addition is effected instead of subtraction.

The structure of the elementary rotation stage, as just described above, is however only necessary for those elementary rotation stages in which rotation is to be effected through elementary angles $2^{-i}$, in respect of which the exponent is i<(b−1)/2. If the exponent i is greater than or equal to that value, multiplication by the term $2^{-(2i+1)}$ in equation 15, that is to say the shift by 2i+1 bit positions, leads to the machine zero so that the (2i+1)-bit shifters 12, 20 and the subtractors 10, 18 can be omitted for elementary rotation stages with i greater than or equal to (b−1)/2.

The CORDIC unit as described hitherto is scaling-free and therefore makes it possible to save on post-processing hardware and process time. Accordingly it makes it possible in particular to leave out elementary angles in the iteration procedure without scaling needing to be effected with a non-constant scaling factor.

The idea of approximating the rotary angle by a series of elementary angles which are sufficiently small that the scaling factor is eliminated however also means that the angular range in which a rotary angle must occur so that it can be approximated is small in comparison with the conventional CORDIC algorithm. If the CORDIC unit is implemented for example with a word length of 16 bits, this means that elementary angles with exponents of between 4 and 15 are used (see above). Accordingly the largest angle which can be approximated is ±7.16°. For comparison purposes: with a conventional CORDIC unit it is possible to approximate rotary angles of up to ±99.9°.

In order to expand the angular range in which an angle must occur so that it can be approximated by the CORDIC unit according to the invention, an "argument reduction method" and a method of repeatedly executing given iteration steps are used. With the argument reduction method the entire angular range of 360° is reproduced onto a reduced angular range. In particular a pre-processing unit which is designed for that purpose is used for effecting the argument reduction method. If the angular range onto which the overall range is reproduced is still larger after execution of the argument reduction method than the angular range in which an angle must lie so that it can be approximated by the CORDIC unit, elementary rotations are repeated in an adaptive fashion. The mode of operation involved is described in detail hereinafter.

Figure 3:
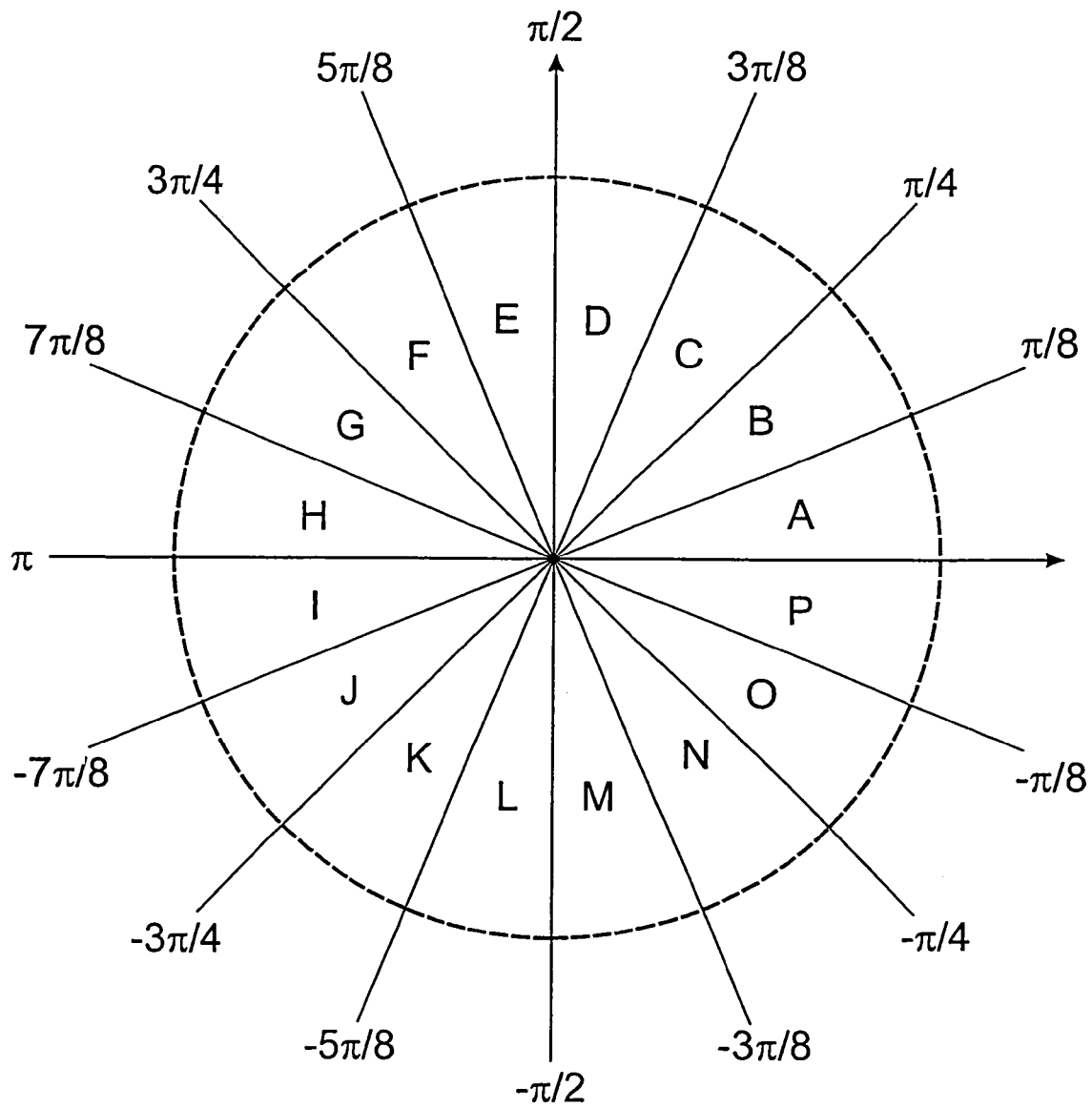
FIG. 3 shows the division of a CORDIC system into domains which are used in pre-processing for the CORDIC algorithm.
Figure 4:
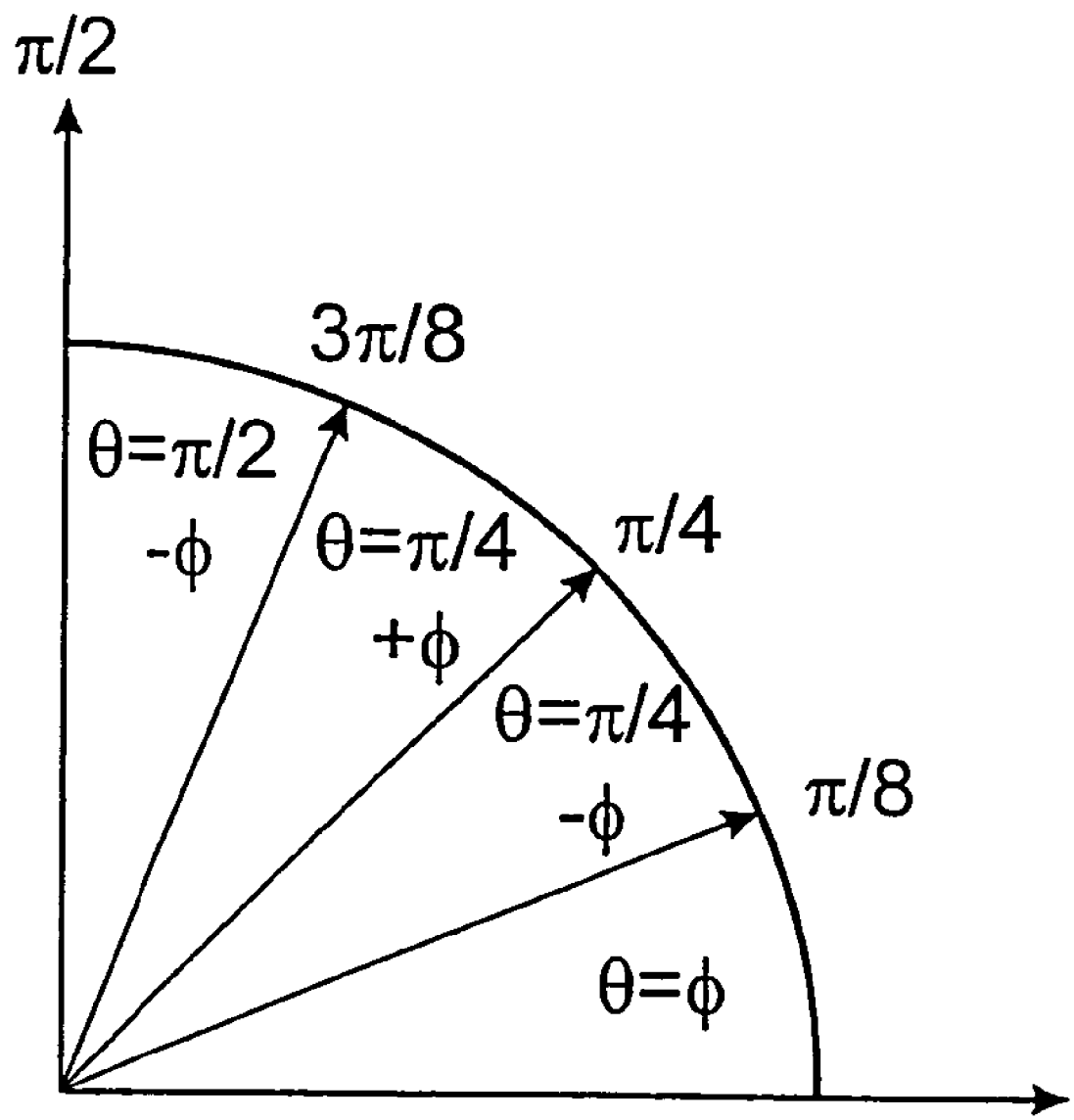
FIG. 4 shows the association of new rotary angles with the domains in the first quadrant of a co-ordinate system.

The main aim of the argument reduction method is to reproduce large rotary angles on small rotary angles. That is achieved by using a method in which the four quadrants of the co-ordinate system are subdivided into 16 equal domains (that is to say four domains per quadrant), wherein each domain covers an angular range of π/8. The domains are shown in FIG. 3 and identified there by letters A through P. Each rotary angle must inevitably lie in one of those 16 domains. A rotary angle θ which is in the first quadrant is in one of the domains A ([0, π/8)), B([π/8, π/4)), C ([π/4,3 π/8)) or D ([3π/8, π/2]). In each domain the rotary angle θ can now be defined as follows by another rotary angle Φ:

θ=Φ in the domain A
θ=π/4−Φ in the domain B
θ=π/4+Φ in the domain C
θ=π/2−Φ in the domain D That is shown in FIG. 4. It should be mentioned that the angle Φ is always in the range [0,π/8]. Using the addition theorems of the sine and cosine function, the rotation in accordance with equation 1 can be represented in the four domains by the following equations:

$$\begin{bmatrix} x1_A \\ y1_A \end{bmatrix} = \begin{bmatrix} \cos\Phi & \sin\Phi \\ -\sin\Phi & \cos\Phi \end{bmatrix} \begin{bmatrix} x0_A \\ y0_A \end{bmatrix} \quad (17)$$

$$\begin{bmatrix} x1_B \\ y1_B \end{bmatrix} = \frac{1}{\sqrt{2}} \begin{bmatrix} (\cos\Phi+\sin\Phi) & (\cos\Phi-\sin\Phi) \\ -(\cos\Phi-\sin\Phi) & (\cos\Phi+\sin\Phi) \end{bmatrix} \begin{bmatrix} x0_B \\ y0_B \end{bmatrix} \quad (18)$$

$$\begin{bmatrix} x1_C \\ y1_C \end{bmatrix} = \frac{1}{\sqrt{2}} \begin{bmatrix} (\cos\Phi-\sin\Phi) & (\cos\Phi-\sin\Phi) \\ -(\cos\Phi+\sin\Phi) & (\cos\Phi-\sin\Phi) \end{bmatrix} \begin{bmatrix} x0_C \\ y0_C \end{bmatrix} \quad (19)$$

$$\begin{bmatrix} x1_D \\ y1_D \end{bmatrix} = \begin{bmatrix} \sin\Phi & \cos\Phi \\ -\cos\Phi & \sin\Phi \end{bmatrix} \begin{bmatrix} x0_D \\ y0_D \end{bmatrix} \quad (20)$$

Having regard to the fact that the rotation through Φ and −Φ respectively in accordance with equation 1 can be expressed by the equations:

$$\begin{bmatrix} x1_+ \\ y1_+ \end{bmatrix} = \begin{bmatrix} \cos\Phi & -\sin\Phi \\ \sin\Phi & \cos\Phi \end{bmatrix} \begin{bmatrix} x0 \\ y0 \end{bmatrix} \quad (21)$$

$$\begin{bmatrix} x1_- \\ y1_- \end{bmatrix} = \begin{bmatrix} \cos\Phi & \sin\Phi \\ -\sin\Phi & \cos\Phi \end{bmatrix} \begin{bmatrix} x0 \\ y0 \end{bmatrix} \quad (22)$$

in which the subscript plus and minus signs in relation to the x1 and y1 identify rotations in the clockwise direction and in the counter-clockwise direction respectively, equations 17 through 20 can be written as follows:

$$x1_A = x1_- \qquad y1_A = y1_- \quad (23)$$

$$x1_B = \frac{1}{\sqrt{2}}[x1_+ + y1_+] \qquad x1_B = \frac{1}{\sqrt{2}}[-x1_+ + y1_+] \quad (24)$$

$$x1_C = \frac{1}{\sqrt{2}}[x1_- + y1_-] \qquad x1_C = \frac{1}{\sqrt{2}}[-x1_- + y1_-] \quad (25)$$

$$x1_D = y1_+ \qquad y1_D = -x1_+ \quad (26)$$

It can be seen from the equations that the results of a CORDIC algorithm for rotary angles which are in various domains in the first quadrant can be computed from the results of a CORDIC algorithm with a rotary angle Φ insofar as simple addition and subtraction operations are carried out. That essentially means that the domains B, C and D are "folded back" onto the domain A. Therefore this method is referred to hereinafter as "domain folding". A consequence of domain folding is the generation of a constant scaling factor $1/\sqrt{2}$ for rotary angles which are either in the domain B or the domain C. That scaling factor however can be sufficiently precisely embodied with minimum hardware expenditure using shifters and adders.

Hitherto consideration has only been given to rotary angles which are in the first quadrant. Utilizing the symmetry of the co-ordinate axes domain folding can also be applied to CORDIC processes in which the rotary angles are in other quadrants. The values resulting therefrom for the rotated components x1 and y1 are to be obtained by interchange and a sign change. The interchanges and sign changes are summarized in the following Table:

| Domain | x1 | y1 |
|---|---|---|
| A | $x1_B$ | $y1_A$ |
| B | $x1_B$ | $y1_B$ |
| C | $x1_C$ | $y1_C$ |
| D | $x1_D$ | $y1_D$ |
| E | $y1_A$ | $-x1_A$ |
| F | $y1_B$ | $-x1_B$ |
| G | $y1_C$ | $-x1_C$ |
| H | $y1_D$ | $-x1_D$ |
| I | $-y1_A$ | $x1_A$ |
| J | $-x1_B$ | $-y1_B$ |
| K | $-x1_C$ | $-y1_C$ |
| L | $y1_D$ | $-x1_D$ |
| M | $x1_A$ | $y1_A$ |
| N | $y1_B$ | $x1_B$ |
| O | $-y1_C$ | $x1_C$ |
| P | $x1_D$ | $-y1_D$ |

Therefore, when computing the vector rotation through any rotary angle, that is to say through a rotary angle which can be in any quadrant, firstly the domain in which the rotary angle lies is determined. As soon as the domain is determined computation of the rotated components of the vector to be rotated can be effected, in which case the corresponding equation is selected from equations 23 through 26. The definitive value for the components of the rotated vector is then determined in dependence on the domain in which the original, that is to say unrotated, vector lay, in accordance with the Table.

Domain folding can be effected not only in the rotation mode but also in the vectoring mode. In the case of the vectoring mode the rotary angle is to be replaced by the value $\tan^{-1}(y0/x0)$. The domains in the first quadrant can then be expressed for example as values of the ratio y0/x0, they are then given by the intervals [0, tan(22.5°)) (domain A), [tan (22.5°), tan (45°)) (domain B), [tan(45°), tan (67.5°)] (domain C).

The domain in which a vector with the components x0, y0 lies can be determined on the basis of four values, namely x0, x0*tan(22.5°), x0*tan(67.5°) and y0. If x0*tan(22.5°) is greater than or equal to y0, the vector is in the domain A, if y0 is greater than x0*tan(22.5°) then the vector is in the domain B, if x0*tan(67.5°) is greater than or equal to y0 the vector is in the domain C and if y0 is greater than x0*tan(67.5°) the vector is in the domain D.

In the case of a vector which is the domain D, because of structure of equations 21 and 22 the components x0 and y0 can be interchanged and then the interchanged components of the vector can be inputted into the CORDIC unit. The interchanged components are then treated in the CORDIC unit like the components of a vector in the domain A. This means that, in the case of a vector in the domain D of the CORDIC unit not y0 but x0 tends towards zero.

The mode of operation of the method used in the CORDIC unit according to the invention, with which rotations through rotary angles in the range of between 0 and 360° can be effected, will now be described with reference to the flow chart shown in FIG. 5, using the example of the rotation mode. Before implementation of the actual iteration process, the angle through which rotation is to be effected is possibly reproduced in the angular range [0, π/8] by a pre-processing device, that is to say the domain in which the unrotated vector lies is determined. Then the input components x and y are read in and i is initialized, that is to say, i is set to the smallest value which is admissible for the corresponding machine. In the case of a 16 bit machine that smallest value i is given by p=4 (see above). In addition the rotary angle θ is inputted as z. In the course of the method that rotary angle z is reduced to such an extent that it approximately reaches the value 0.

In the next step the elementary angle $\alpha_i = 2^{-i}$ is computed on the basis of the initialized value of i. Thereafter the value of z is compared to the value of the elementary angle $\alpha_i$ and the elementary rotation through the elementary angle $\alpha_i$ is triggered if the value of z is greater than the elementary angle $\alpha_i$. If however the value z is smaller than the elementary angle $\alpha_i$ the elementary rotation is not triggered. Instead i is increased by one and a new elementary angle $\alpha_i$ is computed with the value i increased by one. The new elementary angle is then again subjected to the comparison with z. That loop is repeated until the value z is greater than the current elementary angle. As soon as that is the case rotation through the elementary angle is triggered.

Rotation through an elementary angle provides rotated components x' and y'. In addition a new value $z'=z-2^{-i}$ is computed. That value z' represents the residual angle through which rotation still has to be effected. In a second comparison operation a check is now made as to whether the residual angle z' is smaller than a predetermined reference value $R_{ref}$ which gives the greatest admissible deviation of the residual angle from 0. If the residual angle z' is smaller than or equal to that reference value $R_{ref}$ the CORDIC method is terminated and the values x', y' and z' are outputted as end values. If the residual angle z' however is greater than the reference value $R_{ref}$, z', as a new residual rotary angle, is again passed for comparison with the current elementary angle $\alpha_i$ where a check is made as to whether the residual angle is greater than the current elementary angle through which rotation was effected. If that is the case the elementary rotation through the current elementary angle $\alpha_i$ and then comparison of the new residual angle resulting therefrom with the reference value $R_{ref}$ are effected afresh. That loop is executed until the residual value is smaller than the current elementary angle. As soon as the residual angle is smaller than the current elementary angle, i is again increased by one and a new elementary angle is computed. Comparison of the new elementary angle with the residual angle is then effected again, and the result of that is either that the elementary rotation is effected or a new elementary angle is computed. The entire method is carried out until the residual angle is smaller than the predetermined reference value $R_{ref}$.

In regard to the method implemented by means of the CORDIC unit it is to be noted that it is possible to effect rotations through the same elementary angle a plurality of times. Plural implementation of the rotation through a given elementary angle is necessary in order to be able to attain all rotary angles through an interval of between 0 and π/8. As described hereinbefore, in the case of a 16 bit machine, the maximum rotary angle which can be achieved when all steps are executed just once is 7.16°. If the amount of the rotary angle is now in a range which is greater than 7.16° and smaller than 22.5°, the elementary rotation must be effected through the largest admissible elementary angle, that is to say the elementary angle with the exponent −p, until the residual angle can be approximated by the elementary angles with exponents which are larger than −(p+1). As soon as that is achieved no further elementary rotation then has to be repeated, in other words, no rotation through an angle $2^{-(p+1)}$ is repeated.

Figure 6:
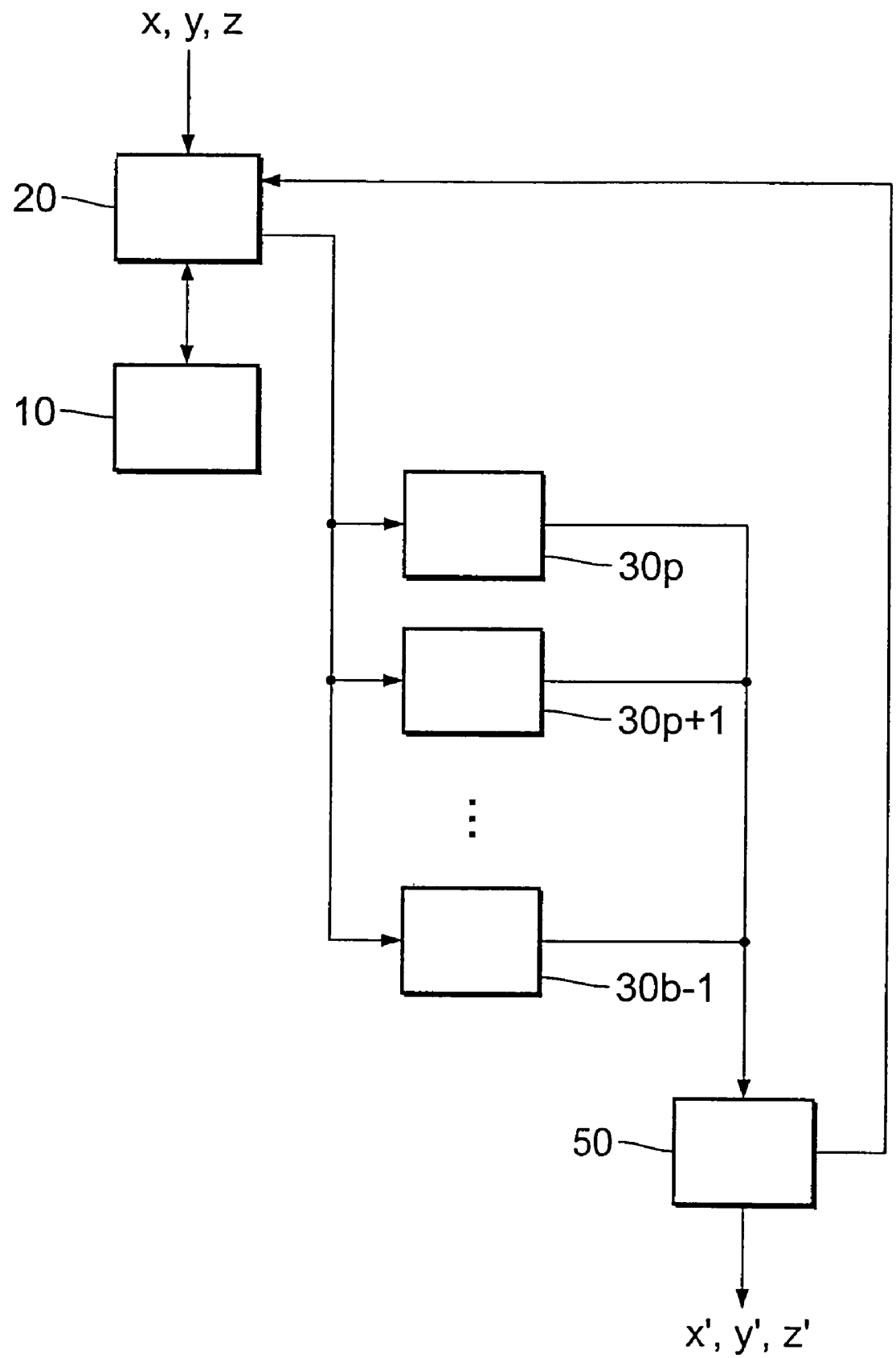
FIG. 6 shows a block circuit diagram of a first embodiment of the CORDIC unit according to the invention.

A block circuit diagram for a CORDIC unit with a word length of b bits, in which the described method is carried into effect, is shown in FIG. 6. The CORDIC unit according to the invention includes a first computing unit 10, a first comparator 20, a second comparator 50 and a number of elementary rotation stages 30p through 30b−1 for effecting elementary rotations with elementary angles $2^{-i}$, wherein i can assume the values p (minimum admissible exponent for the scaling-free method, see above) through b−1. The first computing unit 10 is connected to the first comparator 20. The first comparator 20 is in turn connected to the elementary rotation stages 30p-30b−1 and the second comparator 50 which is also connected to the elementary rotation stages 30p through 30b−1.

The first computing unit 10 serves to compute the elementary rotary angle $\alpha_i$ on the basis of a predetermined exponent i and to output same to the first comparator 20. Besides the elementary rotary angles $\alpha_i$ the first comparator 20 also receives the rotary angle which is given by the value z. In addition the first comparator 20 can be designed to receive the values x and y of the components of the vector to be rotated, and to transmit them to the elementary rotation stages 30p-30b−1. Alternatively there can also be an additional connection for transmitting the values x and y to the elementary rotation stages 30p-30b−1, with the first comparator 20 being by-passed.

The first comparator 20 carries out a comparison between the rotary angle z to be computed and the elementary angle $\alpha_i$ obtained from the first computing unit 10. If the comparison shows that the elementary angle $\alpha_i$ is smaller than or equal to the rotary angle through which rotation is to be effected, the first comparator 20 triggers an elementary rotation through the elementary angle $\alpha_i$. For that purpose it passes the components x and y of the vector to be rotated and the value x of the rotary angle to that elementary rotation stage (or possibly triggers such transmission), which corresponds to the elementary angle $\alpha_i$, that is to say it performs rotation through the elementary angle $\alpha_i$. As a result of the elementary rotation the elementary rotation stage outputs new components x' and y' and a residual rotary angle $z'=z-2^{-1}$ through which rotation is still to be effected to the second comparator 50. Alternatively, for computing the residual rotary angle, a computing unit which is specifically provided for that purpose can also be provided.

If however the comparison shows that the elementary angle $\alpha_i$ is greater than the rotary angle through which rotation is to be effected, then the first comparator 20 causes the computing unit 10 to compute a new elementary angle in respect of which the amount of the exponent is increased by one. The computing unit 10 then outputs the new elementary angle to a first comparator 20 which compares it to the residual rotary angle. In dependence on that comparison, the comparator 20 either triggers elementary rotation or computation of a new elementary angle.

The second comparator 50 compares the residual angle z' outputted by one of the elementary rotation stages to a predetermined reference value $R_{ref}$. In that respect the reference value $R_{ref}$ stands for the maximum deviation that the residual rotary angle may have at the end of the iterative approximation procedure, from the original rotary angle. If the residual rotary angle is below that reference value $R_{ref}$, the second comparator outputs the values x', y' and z' as the end result of iterative approximation. If however the value of the residual rotary angle z' is greater than the reference value $R_{ref}$, then the second comparator 50 passes the values x', y' and z' to the first comparator 20. The first comparator 20 again compares the residual rotary angle z' obtained from the second comparator 50 to the current elementary angle $\alpha_i$ and triggers a further elementary rotation through the elementary angle $\alpha_i$ if the residual rotary angle z' is greater than or equal to the elementary rotary angle $\alpha_i$. The result of this is that elementary rotations through the elementary angle $\alpha_i$ are carried out until the residual angle z' is smaller than the elementary angle $\alpha_i$. As soon as the residual rotary angle z' is less than the elementary angle $\alpha_i$ the first comparator 20 causes the first computing unit 10 to compute the next elementary angle $\alpha_{i+1}$, that is to say, the elementary angle $2^{-(i+1)}$. That new elementary angle is again delivered by the first computing unit 10 to the first comparator 20 which compares the new elementary angle again to the residual angle z'. That is continued until comparison of the residual rotary angle with the respective new elementary angle $\alpha_i$ shows that the residual rotary angle is greater than or equal to the elementary angle. As soon as that is the case the first comparator 20 again triggers elementary rotation.

Figure 7:
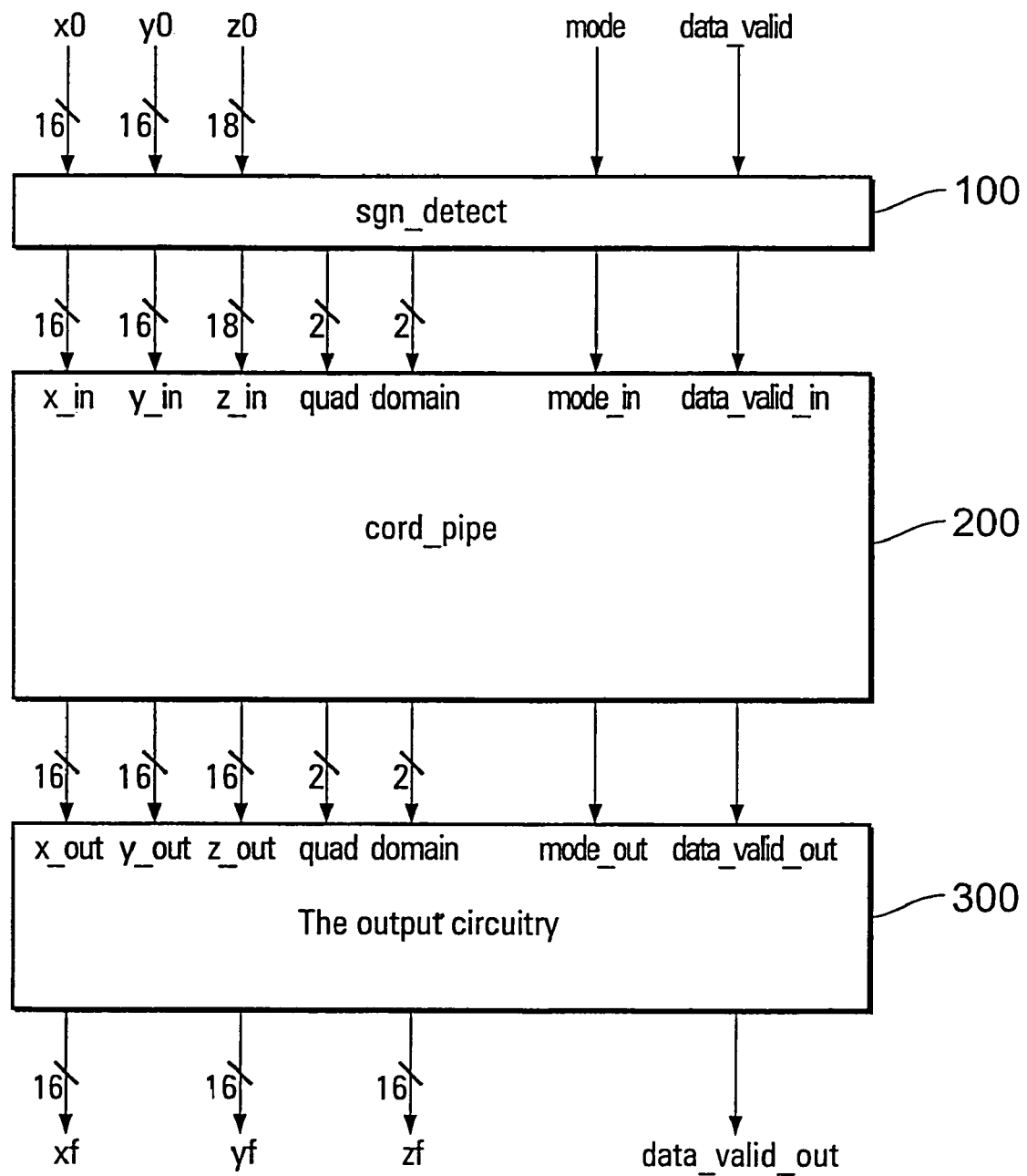
FIG. 7 shows a CORDIC processor which includes a CORDIC unit according to the invention and a pre-processing unit according to the invention.

An implementation of the CORDIC unit according to the invention in the form of a CORDIC processor is shown in FIG. 7. The CORDIC processor includes a pre-processor 100 as a pre-processing unit, a pipeline unit 200 as a CORDIC unit for carrying out the actual CORDIC process, referred to hereinafter as the CORDIC pipeline, and an output circuit 300. The pre-processor 100 receives the components x0 and y0 of the vector to be rotated and the rotary angle z0 through which the vector is to be rotated. The inputs for the components x0 and y0 receive 16 bit data words while the input for z0 receives an 18 bit data word. This is because, in the numerical representation adopted here, the value of $2\pi$ includes 18 bits. In addition the pre-processor receives a mode signal "mode" which determines whether the CORDIC processor is to be operated in the rotation mode or in the vectoring mode. The HI level (logic high level) of the mode signal mode causes the processor to operate in the rotation mode whereas the LO level (logic low level) of the mode signal mode causes the processor to operate in the vectoring mode. Besides the mode signal the pre-processor also receives a data valid signal which indicates validity of the input signal.

The pre-processor 100 establishes the sign of the input variables x0 and y0 and the domain in which the vector lies. The pre-processor 100 produces corresponding 2-bit signals "domain" and "quad". The "quad" signal indicates the quadrant in which the target angle lies. The "domain" signal indicates into which corresponding domain in the first quadrant the target angle is folded back. Supplemental to those signals, the pre-processor 100 also provides a sign-less 13-bit binary representation of the modified target angle ($\phi$) for the CORDIC processor. 13 bits are sufficient for the representation of $\phi$ without sign as $\phi$ is in the interval $[0, \pi/8]$. The input variables are then processed accordingly so that the CORDIC pipeline only has to process angles between 0 and $\pi/8$. The operation of determining the sign and the domains, the pre-processing operation and the corresponding input operations require a total of 2 clock cycles.

Figure 8:
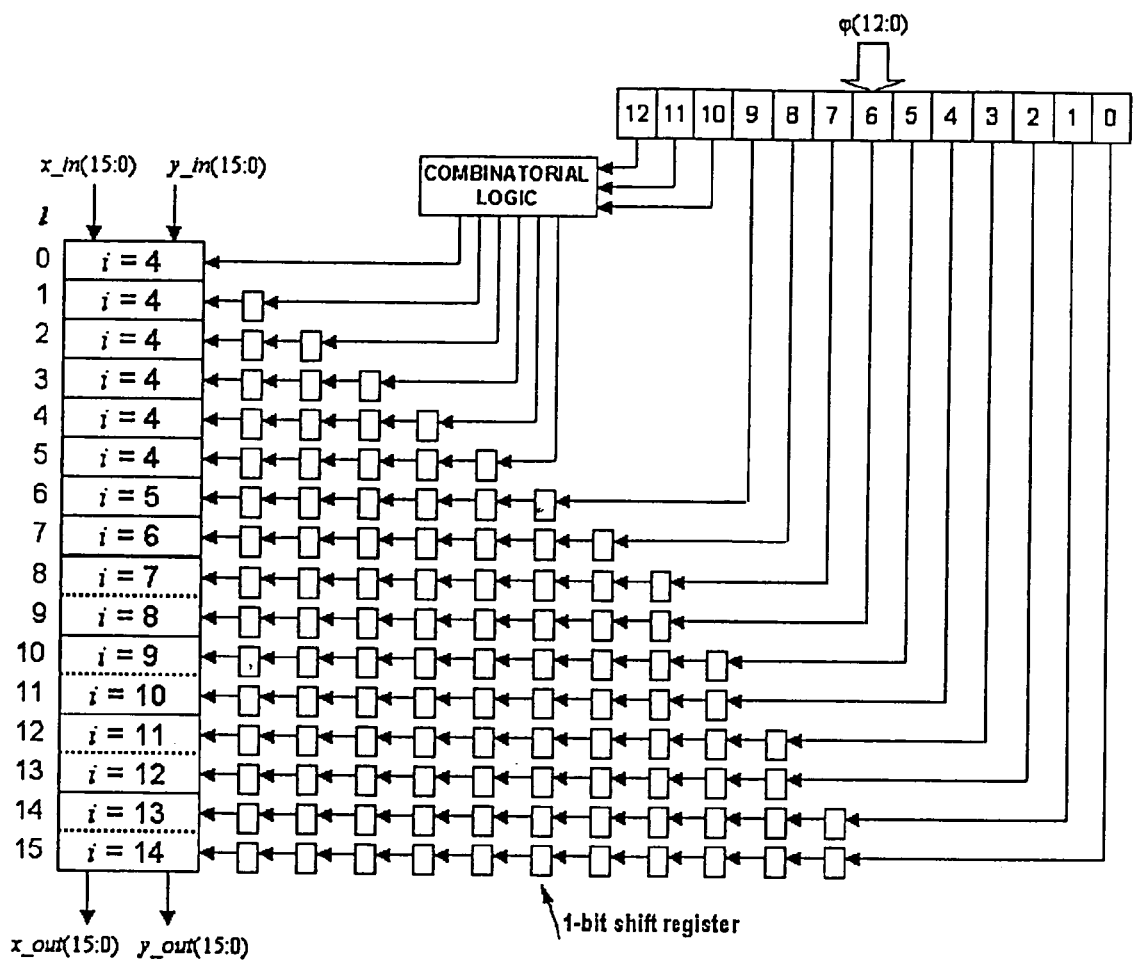
FIG. 8 shows a block circuit diagram of a second embodiment of the CORDIC unit according to the invention.

The CORDIC pipeline which is shown in detail in a particular variant in FIG. 8 is a bit-parallel pipeline implementation of the equations 15 and 16 with an internal word length of 16 bits. The pipeline is 17 stages long. It has elementary rotation stages with elementary angles $2^{-i}$ with i=4, 5, . . . , 15, wherein the elementary rotation stage which corresponds to an elementary angle $\alpha_i$ of $2^{-4}$ is repeated six times. A 16 bit CORDIC unit is illustrated to ensure clarity. All the description hereinafter however can be generalized to embrace the case of an n-bit CORDIC unit.

In the embodiment shown in FIG. 8 each elementary rotation stage contains simple shift registers. Each elementary rotation stage requires a hardware region which corresponds to 4 adder/subtractor units. On the other hand, from theoretical points of view, the required hardware range for elementary rotation stages corresponding to i≧8 (b/2) amounts to two adder/subtractor units. The permitted values of CORDIC iteration are in this case i=4, 5, . . . , 15. In the diagram of the numerical illustration selected here, the shift of each positive operand by 15 bits causes a machine zero. The same operation for a negative operand results in solely the sign bit remaining behind. Therefore the elementary rotation stage corresponding to i=15 is not included in the implementation. On the other hand, the forgoing description also applies for the elementary rotation stage corresponding to i=7. Here the shift of any input value by (2i+1) bits causes a 15-bit right shift of the operand with the same result, that is to say only the sign bit remains behind. Therefore the 2(2i+1)-bit shift registers and the corresponding adders, for the respective elementary rotation stage, can be omitted. Accordingly, the present implementation shown in FIG. 8 involves using four adders/subtractors for each elementary rotation stage corresponding to i=4, 5, 6 and two adders/subtractors for each elementary rotation stage corresponding to i=7, . . . , 14.

The maximum angle which can be computed with the present arrangement is about 25°. That covers the modified convergence range selected here. For the purposes of calibrating the pipeline in regard to the operating speed the elementary rotation stages corresponding to i=(7, 8), (9, 10), (11, 12) and (13, 14) are interlinked, the elementary rotation stages contained in the brackets each forming a respective pipeline stage. With that arrangement the CORDIC pipeline of FIG. 8 is 12 stages deep, the hardware complexity of each of those stages corresponding to 4 16-bit adders.

The aim which is to be achieved with the CORDIC pipeline is that of bringing the value z in the rotation mode or the value y in the vectoring mode respectively to zero with a level of accuracy of less than $2^{-15}$. The usual two-component addition is used in the construction of the elementary rotation stages. The information as to the quadrant in which and the domain in which the input vector with the components x0 and y0 lies, having been determined in the pre-processor, is transmitted between two successive portions of the CORDIC pipeline together with the data in the manner of a logic register transfer. This means that the data in various portions of the pipeline have an identification which substantially contains the information about the original quadrant and the original domain. A 1-bit signal "sign" and the above-mentioned two 2-bit signals "domain" and "quad" are used for the purposes of transferring that item of information between various rotation stages.

The output circuit includes a fixed scaling unit for scaling with the value $1/\sqrt{2}$ and a number of adders/subtractors. That circuit effects post-processing of the output vector which is outputted by the CORDIC pipeline, on the basis of the information about the input vector which has been determined by the pre-processor, and it produces the definitive output signal. All operations of the output circuit can be concluded in one clock cycle.

The structure illustrated in FIG. 8 represents a particular implementation of a CORDIC pipeline. For the architecture described herein, consideration was given to the fact that there are two factors which limit the computing speed. Firstly, the speed of a CORDIC unit is comparatively low because of the iterative character of the CORDIC method. In addition, computation of the residual angle at the beginning of each elementary rotation slows down the speed of the CORDIC unit. Depending on the respective residual angle involved the CORDIC unit either performs a given iteration step or jumps over it. In the implementation described hereinafter those speed-limiting factors are eliminated and thus increase the speed of the CORDIC unit.

It is fundamental for the architecture described hereinafter that the decimal 1 is represented in the form 0100000000000000. On the basis of domain folding all angles of the co-ordinate space are represented in the interval $[0,\pi/8]$. The largest effective target angle which has to be computed is therefore $\pi/8=0.392699$ radian. With the above-specified definition of the decimal 1 that angle can be represented in binary format as 0001100100100010 with an error of $O(2^{-16})$. From the viewpoint of implementation therefore, to represent the absolute value of any angle in the modified convergence range the first 3 MSBs can be omitted and in their place the 13 LSBs can be used. In the architecture described herein that is used to reduce the computing load in the z-data path.

To eliminate the second factor which limits speed, namely computation of the residual angle at the beginning of each iteration, the sign-less 13-bit binary representation of the modified target angle φ, as has been determined in the pre-processor 100, is used to control the elementary rotation stage in question in the pipeline. As already mentioned hereinbefore, in the algorithm of the present invention the target angle is approximated by rotation of the vector in only one and the same direction. That essentially means that the target angle is approached as a sum of $2^{-i}$. Therefore the elementary rotation stages in question can be activated for a given target angle, with which they have a 1-to-1 correspondence in the position of a logic "1" in that 13-bit representation. The Table set out hereinafter summarizes the relationship between the position of logic ones in the representation of φ and the corresponding active elementary rotation stages.

| Position of '1' | 12 | 11 | 10 | 9 | 8 | 7 | 6 | 5 | 4 | 3 | 2 | 1 | 0 |
|---|---|---|---|---|---|---|---|---|---|---|---|---|---|
| Active stage (I) | 4,4, 4,4 | 4,4 | 4 | 5 | 6 | 7 | 8 | 9 | 10 | 11 | 12 | 13 | 14 |

As an example let φ–20° (0.349 radians) be considered. The binary sign-less representation of that angle is 1011001010111. For that target angle the rotation stages i=4, 4, 4, 4, 4, 5, 8, 10, 12, 13 and 14 must be activated.

The deactivated elementary rotation stages which correspond to the bit positions with logic "0" are skipped. That implies a smaller number of arithmetic computing operations, whereby the power consumption can be reduced. It is noted that, by virtue of the angular range of φ between 0 and $\pi/8$, a logic "1" do not in any case appear at the same time on the bit positions 10, 11 and 12 of the sign-less representation of φ.

To maintain the pipeline operation the individual bits of the 13-bit representation of φ are fed to the elementary rotation stages in question in the form of an activation signal for the respective stage in question by an array of single-bit shift registers. The number of shift registers, which corresponds to the respective stage, is so selected that the stage in question is activated in the correct clock cycle. Provided for activation of the stages in question of the six stages with i=4, there is a simple logic combination of the bits of the positions 10, 11 and 12. For the other elementary rotation stages the corresponding bits can be fed directly to the zero shift register of the respective shift register array. The structure of the pipeline CORDIC processor with the arrangement just described above is illustrated in FIG. 8, wherein "I" denotes the index of the elementary rotation stages of the pipeline.

Figure 5:
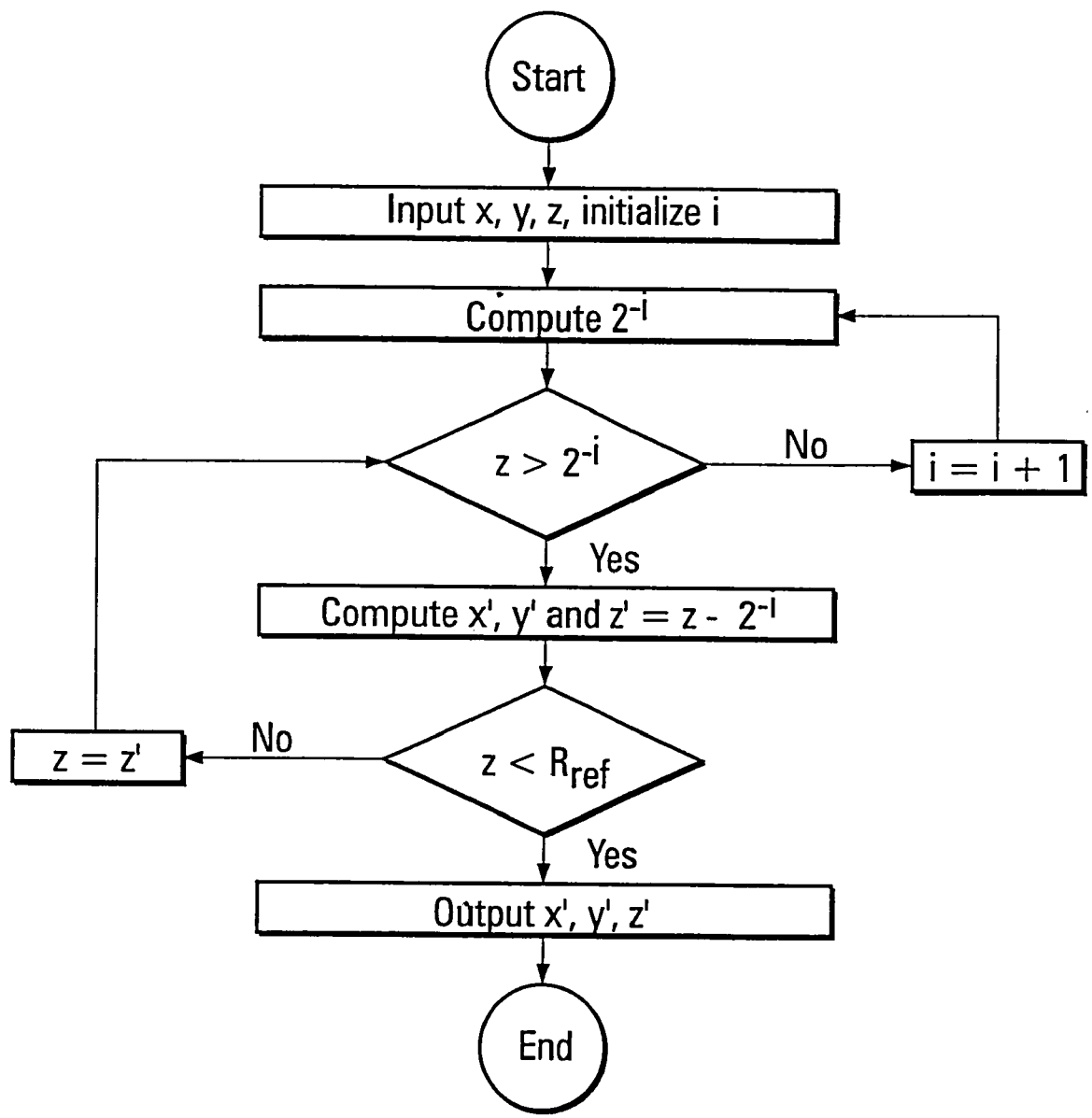
FIG. 5 shows a flow chart illustrating an operating procedure for executing the CORDIC algorithm in the rotation mode.

It is possible with that arrangement to substantially save on the comparison of z with $2^{-i}$ and $R_{ref}$ at the beginning of each iteration, as is shown in the flow chart of FIG. 5, and the subsequent arithmetic computation and corresponding hardware in the z-data path. It is to be noted that, for the conventional CORDIC algorithm, the target angle is approached by the reciprocating motion of the vector. In the conventional CORDIC algorithm therefore it is not possible to take on the algorithm described herein, for elimination of the arithmetic computation in the z-data path.

The elimination, as described herein, of computations in the z-data path and more explicitly comparison operations for the forward rotation mode of the CORDIC processor can also be used for the reverse rotation of the CORDIC algorithm in computation of the arc-tan function.

The output circuit 300 in FIG. 7 includes for example two fixed scaling units for scaling with the value $1/\sqrt{2}$ and two adders/subtractors. Each of the scaling units is transformed with five 15-bit adders. The hardware complexity of this unit therefore corresponds to 12 16-bit adders.

The invention claimed is:

1. A CORDIC unit for effecting a rotation of a vector by a rotary angle, comprising:
   a plurality of elementary rotation stages, each for effecting an elementary rotation of a vector through a respective elementary angle $\alpha_i$ and
   a triggering device operatively engaged with said plurality of elementary rotation stages and configured to iteratively select and trigger a respective one of the elementary rotation stages to effect the respective elementary rotation of the vector, wherein the elementary rotation stages are configured to rotate the vector through elementary angles $\alpha_i$ which are given by respective powers of two with a negative integral exponent, and
   wherein the triggering device is configured to determine, prior to triggering a respective next elementary rotation during the rotation of the vector, a residual angle that remains between the rotary angle and a sum of all elementary angles, by which the vector has been rotated so far during the rotation of the vector and to refrain from triggering all those of the elementary rotation stages, which are configured to effect the elementary rotation through those of the respective elementary angles, which are greater than the residual angle.

2. A CORDIC unit as set forth in claim 1, wherein the triggering device comprises at least
   a first comparator,
   a first computing unit operatively engaged with said first comparator and configured to compute a new elementary angle with a new exponent, which is increased in amount by one in comparison with the elementary angle used for the most recent elementary rotation, for the respective next one of the elementary rotations, and
   a second computing unit operatively engaged with said first computing unit and configured to determine the residual angle after each elementary rotation,
   wherein the first comparator is configured to
      receive the determined residual angle from the second computing unit after each elementary rotation,
      check whether the determined residual angle is greater than or equal to the elementary angle used for the most recent elementary rotation,
      if the residual angle is greater than or equal to the elementary angle used for the most recent elementary rotation, deliver a triggering signal to the respective elementary rotation stage for triggering a renewed execution of the elementary rotation through the elementary angle of the most recent elementary rotation, receive a new elementary angle from the first computing unit and to check whether the determined residual angle is greater than or equal to the new elementary angle and, if the determined residual angle is greater than or equal to the new elementary angle, deliver the triggering signal to that of the elementary rotation stages, which corresponds to the new elementary angle, for triggering an execution of the respective next elementary rotation through the new elementary angle, and otherwise, deliver the triggering signal to the first computing unit, for triggering computation of the next new elementary angle.

3. A CORDIC unit as set forth in claim 1 further comprising a second comparator which is configured to check whether the residual angle is smaller than a predetermined reference value, and to terminate the rotation of the vector if that is the case.

4. A CORDIC unit as set forth in claim 1,
configured to process data words having a word length of b bits,
wherein the number of elementary rotation stages is b−1,
wherein the elementary angles fulfill the equation $\alpha_i = 2^{-i}$, i being a positive integer, and fall into a range between a maximum and a minimum elementary angle,
wherein the maximum elementary angle is given by $2^{-p}$, p being the smallest positive integer i, for which a sum calculated as $$\sum_{n=1}^{\infty} -1^n \frac{2^{-(2n+1)i}}{(2n+1)!}$$

is a machine zero, and
wherein the minimum elementary angle is given by $2^{b-1}$.

5. A CORDIC unit as set forth in claim 4, comprising, for each elementary angle, at least one of the elementary rotation stages for which the whole number i has a larger amount than or is equal to p and has a smaller amount than or is equal to b−1.

6. A CORDIC unit as set forth in claim 5, wherein at least one of the elementary rotation stages is configured to rotate through the maximum elementary angle $\alpha_p = 2^{-p}$.

7. A CORDIC unit as set forth in claim 4,
wherein all those of the elementary rotation stages, which are configured to rotate through an elementary angle whose exponent has an amount greater than or equal to (b−1)/2, include four shifters, two subtractors, and two adders or subtractors, and
wherein all other of the elementary rotation stages include two shifters and two adders or subtractors.

8. The CORDIC unit of claim 1, further comprising
a pre-processing circuit which is configured to change a value of the rotary angle falling into a first angle interval between π/8 and 2π degrees to a mapped value of the rotary angle falling to a second angle interval between 0 and π/8.

9. The CORDIC unit of claim 8,
wherein the pre-processing circuit is configured
to transfer those rotary angles lying in a first quadrant between 0 and π/2 of a two-dimensional co-ordinate system outside the second angle interval to the mapped value in the second angle interval between 0 and π/8, according to a mapping rule as follows:
subtract the rotary angle from π/4 if the rotary angle is in an angle interval between π/8 and π/4,
add π/4 to the rotary angle if the rotary angle is in the interval between π/4 and 3π/8, and
subtract the rotary angle from π/2 if the rotary angle is in the interval between 3π/8 and π/2; and
to transfer any value of the rotary angle which lies between π/2 and π in one of a second through fourth quadrants of the co-ordinate system to a pre-mapped value of the rotary angle in the first quadrant before changing the pre-mapped value of the rotary angle to the mapped value of the rotary angle according to the mapping rule.

* * * * *

UNITED STATES PATENT AND TRADEMARK OFFICE
CERTIFICATE OF CORRECTION

PATENT NO. : 7,606,852 B2
APPLICATION NO. : 10/498707
DATED : October 20, 2009
INVENTOR(S) : Koushik Maharatna et al.

It is certified that error appears in the above-identified patent and that said Letters Patent is hereby corrected as shown below:

Title Page, Item (75), inventor "Banerjee Swapna" should be --Swapna Banerjee--.

Title Page, Item (75), inventor "Dhar Anindya Sundar" should be --Anindya Sundar Dhar--.

In column 7, line 56, "O" should be --$\theta$--.

In column 9, line 42, "231" should be --2-i--.

In column 11, lines 33, 34, which is equation 22, " $\begin{bmatrix} x1 \\ y1 \end{bmatrix} = \begin{bmatrix} \cos\Phi & \sin\Phi \\ -\sin\Phi & \cos\Phi \end{bmatrix} \begin{bmatrix} x0 \\ y0 \end{bmatrix}$ ," should be -- $\begin{bmatrix} x1_- \\ y1_- \end{bmatrix} = \begin{bmatrix} \cos\Phi & \sin\Phi \\ -\sin\Phi & \cos\Phi \end{bmatrix} \begin{bmatrix} x0 \\ y0 \end{bmatrix}$ --.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,606,852 B2 Page 1 of 1
APPLICATION NO. : 10/498707
DATED : October 20, 2009
INVENTOR(S) : Maharatna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1095 days.

Signed and Sealed this

Twelfth Day of October, 2010

David J. Kappos
*Director of the United States Patent and Trademark Office*